United States Patent
Utsunomiya

(10) Patent No.: US 7,443,152 B2
(45) Date of Patent: Oct. 28, 2008

(54) BOOST DC-DC CONVERTER AND SEMICONDUCTOR DEVICE HAVING BOOST DC-DC CONVERTER

(75) Inventor: Fumiyasu Utsunomiya, Chiba (JP)

(73) Assignee: Seiko Instruments Inc., Chiba (JP)

( * ) Notice: Subject to any disclaimer, the term of this patent is extended or adjusted under 35 U.S.C. 154(b) by 84 days.

(21) Appl. No.: 11/412,311

(22) Filed: Apr. 26, 2006

(65) Prior Publication Data

US 2006/0256591 A1    Nov. 16, 2006

(30) Foreign Application Priority Data

Apr. 28, 2005   (JP)   ............... 2005-132521

(51) Int. Cl.
*G05F 1/00* (2006.01)
(52) U.S. Cl. .................... 323/284; 323/285
(58) Field of Classification Search ................ 323/222, 323/259, 282, 284–286
See application file for complete search history.

(56) References Cited

U.S. PATENT DOCUMENTS

| | | | |
|---|---|---|---|
| 5,003,454 A | * | 3/1991 | Bruning ...................... 363/81 |
| 5,982,604 A | * | 11/1999 | Kojima et al. ............... 361/159 |
| 6,037,755 A | * | 3/2000 | Mao et al. .................... 323/222 |
| 6,373,725 B1 | * | 4/2002 | Chang et al. ............. 363/21.01 |
| 6,844,739 B2 | * | 1/2005 | Kasai et al. .................. 324/611 |
| 2004/0004470 A1 | * | 1/2004 | Yoshida et al. .............. 323/284 |
| 2006/0012354 A1 | * | 1/2006 | Nunokawa et al. .......... 323/273 |

FOREIGN PATENT DOCUMENTS

JP    H05-304765    11/1993

* cited by examiner

*Primary Examiner*—Jessica Han
*Assistant Examiner*—Emily Pham
(74) *Attorney, Agent, or Firm*—Brinks Hofer Gilson & Lione

(57) ABSTRACT

Provided is a boost DC-DC converter where electric power to be supplied to a booster circuit is supplied from a power supply and from boosted electric power of the booster circuit which can be actuated at a low voltage. The boost DC-DC converter has a structure in which: a switching device is provided between the power supply and a boosted output of the booster circuit; a storage capacitor for storing electric power to be inputted to the booster circuit and for operating the booster circuit for a predetermined length of time using the stored electric power is additionally provided; and in a case where the booster circuit can generate boosted electric power even when the switching device is turned off, the switching device is turned off.

14 Claims, 2 Drawing Sheets

BOOST DC-DC CONVERTER AND SEMICONDUCTOR DEVICE HAVING BOOST DC-DC CONVERTER

This application claims priority under 35 U.S.C. § 119 to Japanese Patent Application No 2005-132521 filed Apr. 28, 2005, the entire content of which is hereby incorporated by reference.

BACKGROUND OF THE INVENTION

1. Field of the Invention

The present invention relates to a semiconductor device having a boost DC—DC converter for converting input electric power to output electric power having a voltage higher than that of the input electric power. In particular, the present invention relates to a semiconductor device having a boost DC—DC converter that operates at the output voltage when actuated.

2. Description of the Related Art

FIG. 3 illustrates a semiconductor device having a conventional boost DC—DC converter.

As illustrated in FIG. 3, the semiconductor device includes: a power supply 101; a booster circuit 102 for converting electric power supplied by the power supply 101 to electric power having higher voltage; a Schottky diode 304; and a load 103 to be operated by the boosted electric power. The Schottky diode 304 is provided between an input terminal 111 of the booster circuit 102 and a power supply terminal 112 of the booster circuit 102 such that a direction from the input terminal 111 of the booster circuit 102 to the power supply terminal 112 of the booster circuit 102 is a forward direction. Further, an output terminal 113 of the booster circuit 102 is connected to the power supply terminal 112 of the booster circuit 102 and to the load 103.

With the above-described structure, in starting the booster circuit 102, the power supply 101 supplies electric power to the input terminal 111 of the booster circuit 102 and the electric power is further inputted to the power supply terminal 112 of the booster circuit 102 via the Schottky diode 304, to thereby bring the booster circuit 102 into operation. Once the booster circuit 102 is actuated and the boosted electric power is generated at the output terminal 113 of the booster circuit 102, the booster circuit 102 returns the boosted electric power to the power supply terminal 112 of the booster circuit 102 to thereby maintain its boosting operation. It is generally assumed that the boosted electric power would not flow back to the power supply 101 by the rectifying action of the Schottky diode 304. However, as described above, in starting the booster circuit 102, the voltage of the power supply 101 is supplied to the power supply terminal 112 of the booster circuit 102 via the Schottky diode 304, and therefore the booster circuit 102 cannot be brought into operation unless the power supply voltage that is higher than the lowest actuation voltage of the booster circuit 102 by a forward drop voltage of the Schottky diode 304 (hereinafter briefly referred to as Vf) is inputted. Further, when the load 103 is being operated upon start-up of the booster circuit 102, Vf is further increased. In addition, when parasitic resistance or the like is connected in series between the input terminal 111 of the booster circuit 102 and the power supply terminal 112 of the booster circuit 102, it is necessary to input power supply of still higher voltage to actuate the booster circuit 102.

Therefore, in a conventional boost DC—DC converter disclosed in JP 05-304765 A, a switching device is provided between the output terminal 113 of the booster circuit 102 and the load 103 of the boost DC—DC converter of the above structure, and upon starting the booster circuit 102, the switching device is turned off to prevent an operation of the load 103 from increasing Vf, thereby making the power supply voltage for actuating the booster circuit 102 as low as possible.

As described above, in starting a conventional boost DC—DC converter, there is a problem in that the conventional boost DC—DC converter cannot be actuated unless the input voltage of power supply that is higher than the lowest voltage at which the internal booster circuit can be actuated by Vf of the Schottky diode is inputted.

SUMMARY OF THE INVENTION

In order to solve the above-mentioned problem, according to a first aspect of the present invention, there is provided a semiconductor device, including: a power supply for supplying electric power; a booster circuit for boosting the electric power to have a voltage higher than that of the original electric power; a load operated by the boosted electric power; a switching device provided between the power supply and a power supply terminal of the booster circuit for controlling supply of the electric power to the power supply terminal of the booster circuit; a storage capacitor for storing the electric power as stored electric power such that the stored electric power can operate the booster circuit for a predetermined length of time even if the electric power is stopped being supplied to the power supply terminal of the booster circuit; and a voltage detection circuit for detecting a voltage at the power supply terminal of the booster circuit to control on/off of the switching device according to a result of the detection of the voltage, in which: the booster circuit is operated by the electric power supplied via the switching device or by the boosted electric power inputted to the power supply terminal; the voltage detection circuit turns off the switching device that has been turned on, when the voltage at the power supply terminal of the booster circuit becomes equal to or higher than a first voltage which is higher than a lowest voltage at which the booster circuit can be operated; the voltage detection circuit holds the turned-off state of the switching device until the voltage at the power supply terminal of the booster circuit becomes lower than a second voltage that is equal to or higher than the lowest voltage at which the booster circuit can be operated and lower than the first voltage; and the voltage detection circuit holds a tuned-on state of the switching device once the switching device is turned on, until the voltage at the power supply terminal of the booster circuit is equal to or higher than the first voltage.

With the above-described structure, it is possible to attain a boost DC—DC converter which is actuated at power supply voltage lower than that necessary for actuating the above-described conventional boost DC—DC converter.

According to a second aspect of the present invention, there is provided a semiconductor device, including: a power supply for supplying electric power; a booster circuit for boosting the electric power to have a voltage higher than that of the original electric power; a load to be operated by the boosted electric power; a switching device provided between the power supply and a power supply terminal of the booster circuit for controlling supply of the electric power to the power supply terminal of the booster circuit; a storage capacitor for storing the electric power as stored electric power such that the stored electric power can operate the booster circuit for a predetermined length of time even if the electric power is stopped being supplied to the power supply terminal of the booster circuit; and a voltage detection circuit for detecting a voltage at the power supply terminal of the booster circuit to control on/off of the switching device according to the result of detection of the voltage, in which: the booster circuit is operated by the electric power supplied via the switching device or by the boosted electric power inputted to the power supply terminal; the voltage detection circuit turns off the switching device that has been turned on, when the voltage at the power supply terminal of the booster circuit is equal to or higher than a first voltage which is higher than a lowest voltage at which the booster circuit can be operated; and the voltage detection circuit holds the turned-off state of the switching device for a predetermined length of time.

Similarly to the first aspect of the present invention, with the above-described structure, it is possible to attain a boost DC—DC converter which is actuated at power supply voltage lower than that necessary for actuating the above-described conventional boost DC—DC converter.

According to a third aspect of the present invention, there is provided a semiconductor device, including: a power supply for supplying electric power; a booster circuit for boosting the electric power to have a voltage higher than that of the original electric power; a load to be operated by the boosted electric power; a switching device provided between the power supply and a power supply terminal of the booster circuit for controlling supply of the electric power to the power supply terminal of the booster circuit; a storage capacitor for storing the electric power as stored electric power such that the stored electric power can operate the booster circuit for a predetermined length of time even if the electric power is stopped being supplied to the power supply terminal of the booster circuit; and a clock detection circuit for detecting a frequency of a clock signal of a clock output terminal from which a clock signal of an internal oscillation circuit of the booster circuit is outputted to control on/off of the switching device according to the frequency of the clock signal, in which: the booster circuit is operated by the electric power supplied via the switching device or by the boosted electric power inputted to the power supply terminal; the clock detection circuit turns off the switching device that has been turned on, when the frequency of the clock signal is equal to or higher than a first frequency which is higher than a lowest frequency at which the booster circuit can generate the boosted electric power; the clock detection circuit holds the tuned-off state of the switching device until the frequency of the clock signal becomes lower than a second frequency which is equal to or higher than the lowest frequency at which the booster circuit can generate the boosted electric power and lower than the first frequency; and the clock detection circuit holds a turned-on state once the switching device is turned on until the frequency of the clock signal is equal to or higher than the first frequency.

With the above-described structure, it is possible to attain a boost DC—DC converter which is actuated at power supply voltage lower than that necessary for actuating the above-described conventional boost DC—DC converter, and in addition, it is possible to attain a boost DC—DC converter which is actuated at power supply voltage still lower than that necessary for actuating the boost DC—DC converters according to the first and second aspects of the present invention.

According to a fourth aspect of the present invention, there is provided a semiconductor device, including: a power supply for supplying electric power; a booster circuit for boosting the electric power to have a voltage higher than that of the original electric power; a load to be operated by the boosted electric power; a switching device provided between the power supply and a power supply terminal of the booster circuit for controlling supply of the electric power to the power supply terminal of the booster circuit; a storage capacitor for storing the electric power as stored electric power such that the stored electric power can operate the booster circuit for a predetermined length of time even if the electric power is stopped being supplied to the power supply terminal of the booster circuit; and a clock detection circuit for detecting a frequency of a clock signal of a clock output terminal from which a clock signal of an internal oscillation circuit of the booster circuit is outputted to control on/off of the switching device according to the frequency of the clock signal, in which: the booster circuit is operated by the electric power supplied via the switching device or by the boosted electric power inputted to the power supply terminal; the clock detection circuit turns off the switching device that has been turned on, when the frequency of the clock signal is equal to or higher than a first frequency that is higher than a lowest frequency at which the booster circuit can generate the boosted electric power; and the clock detection circuit holds the turned-off state of the switching device for a predetermined time.

With the above-described structure, it is possible to attain a boost DC—DC converter which is actuated at power supply voltage lower than that necessary for actuating the above-described conventional boost DC—DC converter, and in addition, it is also possible to attain a boost DC—DC converter that is actuated at power supply voltage as low as that necessary for actuating the boost DC—DC converters according to the third aspect of the present invention.

As described above, the boost DC—DC converter according to the present invention can be actuated at power supply voltage lower than that necessary for actuating a conventional boost DC—DC converter.

DETAILED DESCRIPTION OF THE PREFERRED EMBODIMENTS

Embodiment 1

Figure 1:
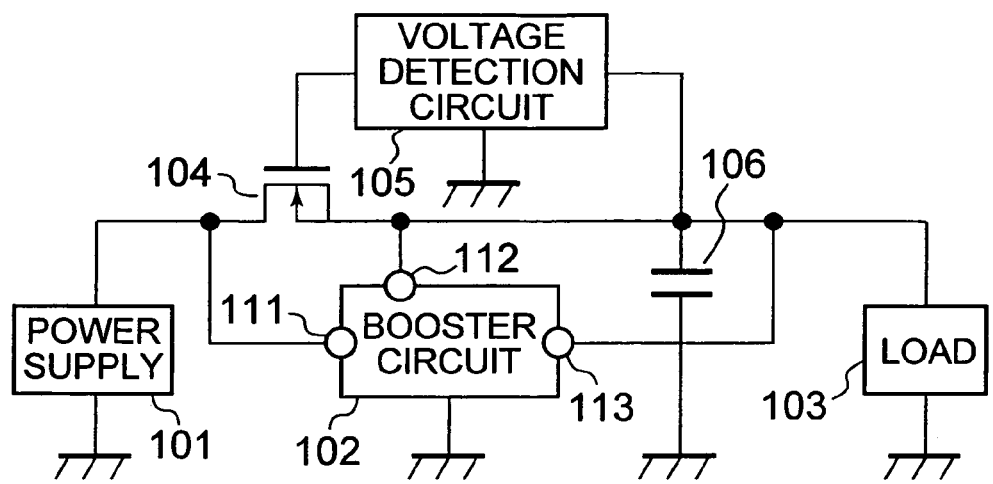
FIG. 1 illustrates a semiconductor device having a boost DC—DC converter according to a first embodiment of the present invention.

FIG. 1 illustrates a semiconductor device having a boost DC—DC converter according to a first embodiment of the present invention.

As illustrated in FIG. 1, instead of the Schottky diode used in the conventional structure of a boost DC—DC converter, a p-channel MOS transistor (hereinafter briefly referred to as PMOS) 104 as a switching device is provided. Further, additionally provided to the conventional structure of a boost DC—DC converter are a voltage detection circuit 105 for detecting voltage at a power supply terminal 112 of a booster circuit 102 to control on/off of the PMOS 104 according to a result of the detection and a storage capacitor 106 for storing electric power such that the stored electric power can operate the booster circuit 102 for a predetermined length of time even when electric power is stopped being supplied to the power supply terminal 112 of the booster circuit 102. The PMOS 104 is connected in series between an input terminal 111 of the booster circuit 102 and the power supply terminal 112 of the booster circuit 102. An output terminal 113 of the booster circuit 102 is connected to the power supply terminal 112 of the booster circuit 102 and to the load 103. The storage capacitor 106 is connected between the power supply terminal 112 of the booster circuit 102 and a ground (GND) terminal. The voltage detection circuit 105 is structured to exhibit hysteresis such that, when the voltage at the power supply terminal 112 of the booster circuit 102 is equal to or higher than a first voltage that is higher by about 0.05 V than the lowest voltage at which the booster circuit 102 can be operated, the PMOS 104 is turned off, and once the PMOS 104 is turned off, the PMOS 104 is not turned on until the voltage at the power supply terminal 112 of the booster circuit 102 becomes lower by about 0.05 V than the first voltage.

The semiconductor device according to the first embodiment of the present invention structured as described above operates as follows. First, when a voltage at the power supply 101 to be inputted to the input terminal 111 of the booster circuit 102 is not high enough and a voltage at the power supply terminal 112 of the booster circuit 102 is short of a predetermined value at which the booster circuit 102 can be actuated, the voltage detection circuit 105 turns on the PMOS 104. Therefore, the same voltage as that at the power supply 101 is supplied to the power supply terminal 112 of the booster circuit 102.

Next, when the voltage at the power supply 101 is increased, the voltage at the input terminal 111 of the booster circuit 102 is increased accordingly, and thus, the voltage at the power supply terminal 112 of the booster circuit 102 is also increased. When the voltage at the power supply terminal 112 of the booster circuit 102 is equal to or higher than the first voltage that is higher by about 0.05 V than the lowest voltage at which the booster circuit 102 can be actuated, the voltage detection circuit 105 turns off the PMOS 104. Therefore, although the electric power is stopped being supplied from the power supply 101 to the power supply terminal 112 of the booster circuit 102, electric power stored by the storage capacitor 106 allows the booster circuit 102 to maintain its actuating operation for some time, and boosted electric power is generated before the voltage detection circuit 105 turns on the PMOS 104 when the voltage at the power supply terminal 112 of the booster circuit 102 becomes lower by about 0.05 V than the first voltage. Since the PMOS 104 is turned off, the boosted electric power does not flow back to the power supply 101. Therefore, voltages at the output terminal 113 of the booster circuit 102 and at the power supply terminal 112 of the booster circuit 102 are increased to a voltage where the load 103 can be operated, and thus, the load 103 can begin its operation and the booster circuit 102 can maintain its operation by the boosted electric power. Therefore, once the boosted electric power is generated, even if the voltage at the power supply 101 becomes lower than the lowest voltage at which the booster circuit 102 can be actuated, the booster circuit 102 can continue to generate the boosted electric power insofar as the electric power supplied from the power supply 101 is equal to or higher than electric power that can maintain voltage equal to or higher than the lowest voltage at which the booster circuit 102 can be actuated.

Therefore, contrary to a conventional boost DC—DC converter in which the input voltage is required to be higher than the lowest voltage at which the internal booster circuit can be actuated by Vf (0.15 V-0.3 V) of the Schottky diode, in the boost DC—DC converter according to the first embodiment of the present invention, the input voltage is required to be higher than the lowest voltage at which the internal booster circuit can be actuated by only about 0.05 V. In other words, the actuation voltage of the boost DC—DC converter according to the first embodiment of the present invention can be lower by about 0.1 V-0.25 V than that of the conventional boost DC—DC converter.

It should be noted that, although the voltage detection circuit exhibits hysteresis in the first embodiment described above, it goes without saying that, instead of the hysteresis, delay time may be provided such that, once the PMOS is turned off, the off state is maintained for some time, and the booster circuit is actuated during the delay time.

Further, it also goes without saying that the booster circuit may be of a type using a coil or a transformer or a type using a capacitor.

Embodiment 2

Figure 2:
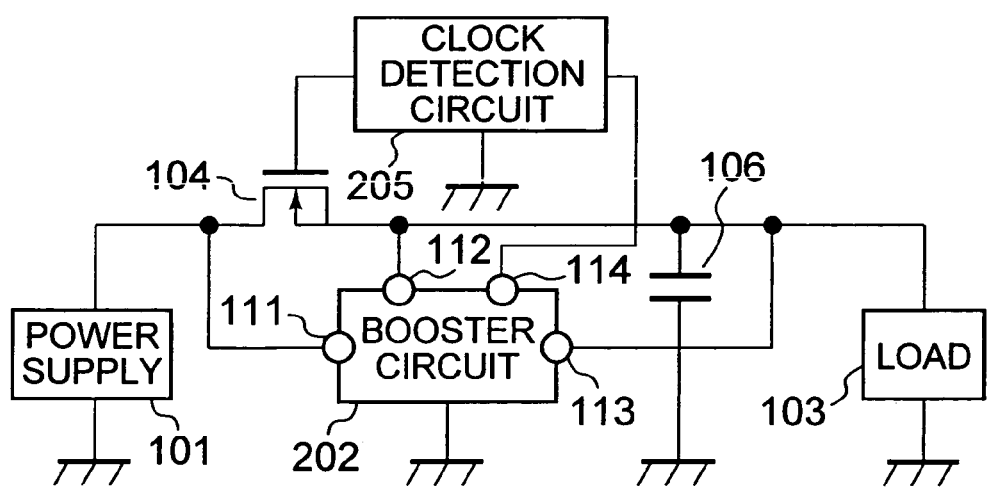
FIG. 2 illustrates a semiconductor device having a boost DC—DC converter according to a second embodiment of the present invention.
Figure 3:
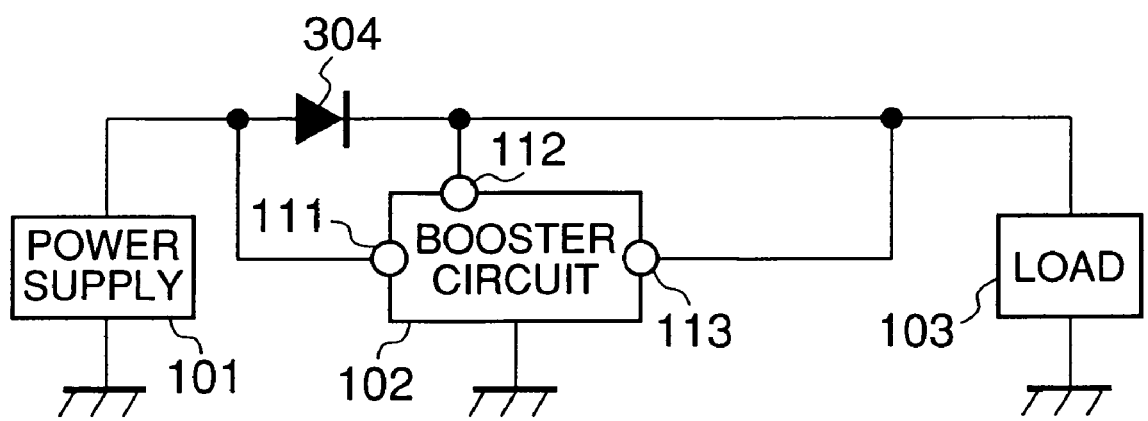
FIG. 3 illustrates a semiconductor device having a conventional boost DC—DC converter.

FIG. 2 illustrates a semiconductor device having a boost DC—DC converter according to a second embodiment of the present invention.

As illustrated in FIG. 2, instead of the booster circuit 102 of the boost DC—DC converter and the voltage detection circuit 105 of the first embodiment illustrated in FIG. 1, a booster circuit 202 which is the booster circuit 102 having a clock output terminal 114 attached thereto for outputting a clock signal of an internal oscillation circuit of the booster circuit 102, and a clock detection circuit 205 for turning off the PMOS 104 when the frequency of a clock signal outputted from the clock output terminal 114 of the booster circuit 202 is equal to or higher than a first frequency that is slightly higher than the lowest frequency at which the booster circuit 202 can generate the boosted electric power and turning on the PMOS 104 when the frequency of the clock signal is lower than the lowest frequency at which the booster circuit 202 can generate the boosted electric power. The structure and operation of the present embodiment with regard to points other than the above is exactly the same as those of the first embodiment described above and illustrated in FIG. 1.

The boost DC—DC converter of the second embodiment according to the present invention which is structured as described above can solve a problem inherent in the first embodiment that uses the voltage detection circuit. That is, according to the first embodiment, the power supply voltage of the booster circuit is used to indirectly detect a frequency of the clock signal reaching the lowest frequency at which the booster circuit can be actuated, so the detection accuracy is low, and thus, the margin of the detected voltage is required to be wide, and the lowest voltage at which the booster circuit can be actuated is made higher accordingly. However, according to the second embodiment, the clock frequency at which the booster circuit can be actuated is directly detected by using the clock detection circuit, and thus, the detection accuracy is high, and it is possible to set the booster circuit so as to be actuated at input voltage that is lower than that of the first embodiment due to the narrower margin. As a result, the second embodiment makes it possible to make still lower the lowest voltage at which the boost DC—DC converter can be actuated.

It should be noted that, although the clock detection circuit provides hysteresis to the clock frequency to be detected in the second embodiment described above, it goes without saying that, instead of the hysteresis, delay time may be provided such that, once the PMOS is turned off, the off state is maintained for some time, and the booster circuit is actuated during the delay time.

Further, it also goes without saying that the booster circuit may be of a type using a coil or a transformer or a type using a capacitor.

A boost DC—DC converter according to the present invention can be effectively utilized when electric power of a power supply with a low voltage converted to electric power with a voltage high enough to operate a load. In particular, in a power supply for electric power generation using natural energy such as a fuel cell or a solar cell which has been attracting attention in recent years, output voltage is becoming smaller due to miniaturization of the power supply, and the boost DC—DC converter can be effectively utilized when electric power of such a power supply is converted to electric power with a voltage high enough to operate a load.

What is claimed is:

1. A semiconductor device, comprising:
    an input power supply configured to supply input power;
    a booster circuit configured to boost the input power supplied from the input power supply, the booster circuit having an input terminal that receives the input power from the input power supply, a power receiving terminal that receives operation power for operating the booster circuit, and an output terminal that outputs the boosted input power to a load;
    a switching device connected between the input power supply and the power receiving terminal of the booster circuit and configured to switch the operation power received by the power receiving terminal between the input power from the input power supply and the boosted input power from the output terminal; and
    a voltage detection circuit responsive to a voltage change of the operation power at the power receiving terminal of the booster circuit to control the switching device to select between the input power from the input power supply and the boosted input power from the output terminal.

2. A semiconductor device according to claim 1, wherein the voltage detection circuit is configured to detect:
    a second threshold voltage that is higher than a lowest operational voltage of the booster circuit; and
    a first threshold voltage that is lower than the second threshold voltage.

3. A semiconductor device according to claim 2, wherein the voltage detection circuit is configured to:
    switch the switching device to select the boosted input power from the output terminal when the voltage detection circuit detects that a voltage at the power receiving terminal becomes equal to or higher than the second threshold voltage; and
    hold the switching device to keep the boosted input power selected until the voltage detection circuit detects that the voltage at the power receiving terminal becomes equal to or lower than the first threshold voltage.

4. A semiconductor device according to claim 2, wherein the voltage detection circuit is configured to:
    switch the switching device to select the input power from the input power supply when the voltage detection circuit detects that a voltage at the power receiving terminal becomes equal to or lower than the first threshold voltage; and
    hold the switching device to keep the input power selected until the voltage detection circuit detects that the voltage at the power receiving terminal becomes equal to or higher than the second threshold voltage.

5. A semiconductor device according to claim 2, wherein the first threshold voltage is lower than the lowest operational voltage of the booster circuit.

6. A semiconductor device, comprising:
    an input power supply configured to supply input power;
    a booster circuit configured to boost the input power from the input power supply, the booster circuit having an input terminal that receives the input power form the input power supply, a power receiving terminal that receives operation power for operating the booster circuit, an output terminal that outputs a boosted input power to a load, and a clock output terminal that outputs a clock signal at a frequency variable according to an operation condition of the booster circuit;
    a switching device connected between the input power supply and the power receiving terminal of the booster circuit and configured to switch the operation power received by the power receiving terminal between the input power from the input power supply and the boosted input power from the output terminal; and
    a clock detection circuit responsive to a frequency change of the clock signal from the clock output terminal to control the switching device to select between the input power from the input power supply and the boosted input power from the output terminal.

7. A semiconductor device according to claim 6, wherein the clock detection circuit is configured to detect:
    a second threshold frequency that is higher than a lowest frequency at which the booster circuit is operational to generate the boosted input power; and
    a first threshold frequency that is lower than the second threshold frequency.

8. A semiconductor device according to claim 7, wherein the clock detection circuit is configured to:
    switch the switching device to select the boosted input power from the output terminal when the clock detection circuit detects that the frequency of the clock signal becomes equal to or higher than the second threshold frequency; and
    holding the switching device to keep the boosted input power selected until the clock detection circuit detects the frequency of the clock signal becomes equal to or lower than the first threshold frequency.

9. A semiconductor device according to claim 7, wherein the clock detection circuit is configured to:
    switch the switching device to select the input power from the input power supply when the clock detection circuit detects that the frequency of the clock signal becomes equal to or lower than the first threshold frequency; and
    holding the switching device to keep the input power selected until the clock detection circuit detects that the frequency of the clock signal becomes equal to or higher than the second threshold frequency is detected.

10. A semiconductor device according to claim 7, wherein the first threshold frequency is lower than the lowest frequency at which the booster circuit is operational to generate the boosted input power.

11. A semiconductor device according to claim 1, wherein the switching device comprises a MOS transistor whose drain is connected to the input power supply, the gate is connected to the voltage detection circuit and the source is connected to both the power receiving terminal and the output terminal of the booster circuit, and
    the MOS transistor is turned on and off by the voltage detection circuit so that the MOS transistor is turned on to electrically connect the input power supply to the power receiving terminal of the booster circuit so as to supply the input power to the power receiving terminal, wherein being turned off to electrically isolate the input power supply from the power receiving terminal so as to supply the boosted input power to the power receiving terminal.

12. A semiconductor device according to claim 11, further comprising a storage capacitor connected between the power receiving terminal of the booster circuit and a ground (GND), wherein the storage capacitor supplies the operation power to the power receiving terminal for a period of time after the MOS transistor is turned off.

13. A semiconductor device according to claim 6, wherein the switching device comprises a MOS transistor whose drain is connected to the input power supply, the gate is connected to the voltage detection circuit and the source is connected to both the power receiving terminal and the output terminal of the booster circuit, and the MOS transistor is turned on and off by the voltage detection circuit so that the MOS transistor is turned on to electrically connect the input power supply to the power receiving terminal of the booster circuit so as to supply the input power to the power receiving terminal, wherein being turned off to electrically isolate the input power supply from the power receiving terminal so as to supply the boosted input power to the power receiving terminal.

14. A semiconductor device according to claim 13, further comprising a storage capacitor connected between the power receiving terminal of the booster circuit and a ground (GND), wherein the storage capacitor supplies the operation power to the power receiving terminal for a period of time after the MOS transistor is turned off.

* * * * *